United States Patent [19]
Hyll

[11] Patent Number: 5,192,142
[45] Date of Patent: Mar. 9, 1993

[54] PUMP IMPELLER RELEASE COLLAR ASSEMBLY

[75] Inventor: John Hyll, Sandy, Utah

[73] Assignee: Baker Hughes Incorporated, Houston, Tex.

[21] Appl. No.: 589,319

[22] Filed: Sep. 27, 1990

[51] Int. Cl.⁵ ........................ F16B 1/00; F04D 29/08
[52] U.S. Cl. .................................. 403/16; 403/26; 403/261; 403/320; 411/535; 415/131
[58] Field of Search .................... 403/11, 24, 26, 259, 403/261, 320, 16, 315, 350, 367, 370, 409.1; 411/535, 536, 539, 916; 417/423.1; 415/129, 131

[56] References Cited

U.S. PATENT DOCUMENTS

| | | | |
|---|---|---|---|
| 427,887 | 5/1890 | Muir | 411/535 |
| 774,042 | 11/1904 | Cooper | 411/535 X |
| 811,035 | 1/1906 | Chidester | 411/535 |
| 1,347,687 | 7/1920 | Ellis et al. | 411/536 X |
| 2,228,005 | 1/1941 | Giles | 411/536 |
| 2,708,132 | 5/1955 | O'Neill | 403/320 |
| 3,285,568 | 11/1966 | Biach | 411/535 X |
| 3,869,030 | 3/1975 | Masaki | 403/320 X |
| 4,351,407 | 9/1982 | Call | 403/261 X |
| 4,376,592 | 3/1983 | Martinek | 403/26 |
| 4,416,563 | 11/1983 | Zemke et al. | 403/26 X |
| 4,521,151 | 6/1985 | Frater et al. | 415/131 |
| 4,575,306 | 3/1986 | Monnot | 415/131 |
| 4,869,694 | 9/1989 | McCormick | 403/16 X |
| 4,966,474 | 10/1990 | Geiger | 403/320 X |

FOREIGN PATENT DOCUMENTS 0028427 10/1980 European Pat. Off. .
2611237 3/1976 Fed. Rep. of Germany .
3208733 3/1982 Fed. Rep. of Germany .

Primary Examiner—Peter M. Cuomo
Attorney, Agent, or Firm—Trask, Britt & Rossa

[57] ABSTRACT

An improved collar assembly adapted for easing the disassembly of stacked members on a shaft subjected to compressive loading is disclosed. The collar assembly includes a pair of collar members which are mounted contiguously abutting one another along a planar angulated interface. One of the collar members defines a bore therethrough configured to closely correspond to the exterior diameter or exterior configuration of the shaft in which the collar assembly is to be mounted. The second collar assembly defines a bore therethrough which is dimensioned to be substantially larger than the shaft exterior configuration in which the assembly is to be mounted. The disparity in the bore sizes permits the second collar to be displaced laterally as well as axially along the shaft with respect to the shaft and along the planar interface of the two-collar members. The two-collar members define the respective exterior engagement surface adapted to engage and otherwise abut against a member stacked on the shaft. The distance between the opposing engagement surfaces thereby adjustable dimensionally as the second collar member is displaced along the surface of the first collar member. A cover, adapted to retain the two collars in alignment one with the other, is configured to be positioned about the two collars. One or more jack screws may be mounted within the second collar member to releasably retain that member in a selected orientation vis-a-vis the shaft.

24 Claims, 8 Drawing Sheets

PUMP IMPELLER RELEASE COLLAR ASSEMBLY

BACKGROUND OF THE INVENTION

1. Field

This invention relates to apparatus for disassembling stacked members from a pump impeller shaft. More particularly, the invention is directed to an apparatus for easing the disassembly of stacked members from a pump impeller shaft wherein those members have been subjected to compressive loading.

2. State of the Art

Many types of pumps employ shafts in their construction. Oftentimes structural members are stacked or otherwise mounted on these shafts to accomplish various mechanical purposes. Due to the operational nature of these pumps and the uses made of such shafts, frequently the members shafts are subjected to compressive loading. The application of loading forces to the various structural members may cause these members to be difficult to remove for servicing.

For example, in a conventional pump, an impeller is attached to its support shaft by means of a threaded connection. The impeller hub is threaded on the end of the shaft until it bottoms out against a shaft sleeve and/or shaft shoulder. During the operation of the pump, the torque forces which were initially applied in mounting the hub onto the shaft are supplemented by those forces resulting from the impeller pumping torque. Tightening torque is initially applied mechanically and increases during pump operation, e.g., motor shaft torque transmitted to oppose impeller fluid pumping torque. This results in further screwing of the impeller against the shaft shoulder or shaft sleeve. The result is that compressive forces are set up in the threads, shaft shoulder or shaft sleeve and the assembly acts as a preloaded spring with a loaded length shorter than the free length.

Recognizing that impellers, or pumps in general, require maintenance for their proper continued operation, and furthermore, recognizing that many of the component parts of the pump assembly itself must be removed from the pump for purposes of servicing and maintenance, it becomes apparent that oftentimes the pump assembly must be disassembled in order to permit proper servicing. In those environments wherein the above-described force applications cause the impeller or associated sleeves and the shaft shoulder to become compressively loaded, this disassembly may be very difficult. Observably, the repairman must overcome the effects of relatively high compressive load forces in order to separate the various structural members of the pump assembly.

The conventional method for disassembling an impeller from its support shaft is to apply an impact torque force to a special wrench which has been attached to the support shaft and locked into a keyway associated therewith. The impeller itself must be locked into position and rendered immobile in order to apply the torque force to the support shaft. Due to its particular configuration, the impeller presents a rather difficult structure to immobilize. A further drawback to the conventional method is the fact that the application of impact wrench loads are often detrimental to shaft bearings.

Efforts have been made in the art to provide a collar-type arrangement which is positionable on the shaft between the members being compressively loaded, e.g. the impeller and the shaft shoulder. This collar-type arrangement has been adapted to relieve the compressive loads which may have been applied to the structural members stacked on the pump shaft. In this approach it has been customary to construct a collar having a plurality of segments which may be individually removed radially from the shaft by jacking, prying, or impacting.

The use of a multi-segmented collar assembly has been found to present certain disadvantages. In utilizing such an assembly, the first few segments are relatively easily removed from the collar assembly. As the shaft-mounted segments decrease in number, the forces being applied to the remaining segments increase sufficiently that upon the repairman reaching the last-in-place segment, that segment is then subjected to an axial compressive load which requires an excessively large removal force in order to extract it from positioning on the pump shaft. Understandably, the increase in the compressive load on this last segment and the magnitude of the force required to remove it increases the likelihood that the last segment will be deformed or otherwise damaged during the removal process.

Another disadvantage is that the use of multi-segmented collar assemblies involves the use of number of segments which may be easily lost or misplaced during the removal and/or installation process.

The environments in which pumps are called on to function oftentimes are chemically or environmentally hazardous. In such environments, the various pump components are subjected to harsh and corrosive chemical substances. The use of pump assemblies in such environments can effect the operation of the conventional multi-segment collar assembly in that the environment may contribute to the various segments of the collar assembly being rendered inseparable from one another. As a result, it is difficult to separate one segment from another in order to properly follow the disassembly method for removing the collar assembly.

A fourth complication attending the use of multi-segment collar assemblies is the fact that these assemblies present a less than smooth outer surface. When the collar assemblies are rotated during the operation of the pump, they may present a hazard to the pump operator. More specifically, the outer surface of the segmented design is often times interrupted by the structural features of fasteners or impact lugs which are required for the proper operation of the multi-segment collar assembly. These collar assemblies often must be located proximate to the pump packing adjustments where shaft leakage containment corrections are made by the operator. Since the operator regularly must be near or in the area of the plural segmented collar assemblies, the rotation of the assembly during the pump's operation, together with the less than uniform surface of the collar assembly may present a hazard to an operator in that the non-uniform surface may catch or otherwise contact the clothing or actual person of the operator.

In view of the present state of the art, there continues to be a pressing need for a collar assembly adapted for facilitating the disassembly of various stacked members on a shaft which have been subjected to high compressive loading. This new collar assembly should remedy many of the less than favorable structural characteristics of the conventional plural segmented collar assemblies.

SUMMARY OF THE INVENTION

In one embodiment, the pump impeller release collar assembly of the invention is adapted for selective release of compressive loading forces generated in a threaded connection on a rotatable shaft assembly fitted with a threaded member. The shaft assembly may include a shaft having a threaded portion at one end thereof adapted to receive the threaded member in threaded engagement. Bearing means may be positioned at the other end of the shaft, adapted for mounting the shaft for rotation but preventing axial movement of the shaft relative to the bearing means. An abutment sleeve mounted on the shaft for limited axial movement may be adapted to be engaged by the threaded member to limit axial movement of the threaded member on the shaft upon threaded assembly of the threaded member for generating a predetermined level of compressive force in the threaded connection, but subject to the generation of increased resultant compressive force loading upon further tightening of the threaded member on the shaft. In this embodiment, the pump impeller release collar assembly includes a pair of collars carried on the shaft one behind the other, i.e. in tandem in the axial direction of the shaft and is positioned generally between the abutment sleeve and the bearing means. The collars are in surface-to-surface engagement and subject to compressive force loading which is generated by the threaded member. The collars are movable relative to each other in a direction along the longitudinal axis on the shaft between a first position, constituting an assembly position, and a second position, constituting a disassembly position. The collars are held in surface-to-surface engagement by the compressive loading on the collars. The collars, when in their assembly position, together present a relatively wide axial width and withstand the full compressive load on the abutment collar. When in their disassembly position, the collars together present a relatively narrow axial width for reducing the compressive load on the abutment collar and threaded connection for facilitating disassembly of the threaded member from the shaft.

In one embodiment of the instant invention, the collars are adapted to be slidable one on the other along an interface, i.e. the surface-to-surface engagement. The two collars are adapted for positioning between a pair of shaft-mounted members. The assembly is adapted to abut against each of the members which are positioned substantially opposite one another about the collar assembly. As the shaft-mounted members are axially loaded, the axial force is transmitted to the collar assembly due to its abutment against the aforesaid members. A first collar is configured to define a bore therethrough which is dimensioned to substantially correspond to the outer diameter of the shaft on which the collar assembly is to be mounted. The first collar member is configured for longitudinal displacement along the shaft. The second collar defines a bore therethrough which is dimensioned to be substantially larger than the corresponding outer diameter of the shaft. The bore in this second collar permits that collar to be displaced laterally, i.e., radially from the longitudinal axis of the shaft. The second collar is equally capable of being displaced longitudinally along the length of the shaft.

Each of the collars defines an abutment surface adapted for abutting against a corresponding respective shaft-mounted member. Each of the collars also defines an engagement surface which may be generally positioned opposite from the abutment surface of the collar. In some constructions, at least one of the engagement surfaces of the collars is generally planar in configuration. In the alternative constructions, both of the engagement surfaces are planar in construction.

In some embodiments, at least one of the engagement surfaces is constructed to be oriented at an obtuse or acute angle to the longitudinal axis of the shaft on which the collar is mounted, thereby forming an angulated interface when the collars are abutted. As the two collars are positioned contiguously in an abutting relationship one with another on the shaft, it is recognizable that the second collar member, having the larger bore, is adapted to slide along the angulated interfacial surface of the collars in both a lateral, i.e., radial direction, and longitudinal direction.

The association of the collar members defines a distance between the corresponding abutment surfaces. The dimensional length of this distance ca be varied by adjusting the relative positioning of the two collars vis-a-vis each other. Due to the angled surface of one of the engagement surfaces, as the collar members are displaced vis-a-vis one another, laterally, as well as longitudinally along the shaft, the dimensional distance between the abutment surfaces may be decreased when this distance is decreased through compressive loading on the sleeves abutting the collar assembly is correspondingly released.

The second collar member, having the larger bore defined therethrough, may be fitted with one or more jacking screws. These screws may be fitted with male threads and are threadedly inserted through a female-threaded aperture in the collar. Each jacking screw extends through a width of its respective collar to communicate with the shaft, retained within the bore of the collar. By threadedly inserting or retracting the screw through its aperture, the user is able to abut the screw against the shaft and thereafter, displace the collar vis-a-vis the shaft. It follows that by utilizing the jacking screws, the user may displace the collar towards or away from the shaft. Due to the second collar's abutting relationship with the first collar and the compressive loading on the two collars, the displacement of the second collar vis-a-vis the shaft causes the second collar to be displaced laterally as well as longitudinally with respect to the shaft. By utilizing the jacking screws, the operator may control the width of the collar assembly and hence the distance between the opposing abutment surfaces, by displacing the second collar along the interface of the two-collar assembly.

In an assembled condition, a cover may be fitted about the pair of collars to position and align those collars in a preselected abutted relationship and to prevent outside contamination from contacting the collars, specifically the engagement surfaces. The cover is configured to cover the jacking screws. The cover may include a plurality of cover plugs which are releasably secured in the cover which provide access to the jacking screws and seal the jacking screws from outside contamination.

The cover may be fitted with an alignment means which is adapted to urge and retain the pair of collars in a preselected orientation during the operation of the collar assembly. In one construction, the cover defines an inner surface and a lip thereon which is adapted to engage the outer surfaces of the two collars and force them into the preselected orientation. The cover may further be fitted with a key which intercooperates with corresponding key slot formed in the two collars. The cover is positionable in two orientations. A first orientation aligns and positions the two collars in a functional condition suited for being compressively loaded by the abutting shaft sleeves. A second orientation of the cover permits the user to slidably displace the second collar along the planar interface of the two collars and thereby relieve the compressive loading on the collar assembly and the shaft sleeves. In order for the user to obtain the second orientation for purposes of accessing the jacking screws for purposes of adjusting the positioning of one collar with respect to the other collar, the cover assembly is displaced longitudinally along the surface of the collars. The cover may be fitted with a restraining means adapted to position the openings, sealed by the cover plugs, over their respective jacking screws. Upon a selected longitudinal displacement of the cover. When the restraining means engages against a sidewall of a collar defined recess well, the cover is positioned so that the cover plugs may be removed to reveal the heads of the jack screws. Upon the screw(s) being rotated, the head of the screw is urged against the shaft thereby effecting a displacement of the second vis-a-vis the shaft. The collar is furthermore displaced vis-a-vis the other collar, the dimensional width of the collar assembly is reduced. As the collar assembly width is decreased, the compression on the members abutting the abutment surfaces of the collar assembly is released, thereby facilitating the disassembly of the members from their support shaft.

DETAILED DESCRIPTION OF THE ILLUSTRATED EMBODIMENT

Figure 1:
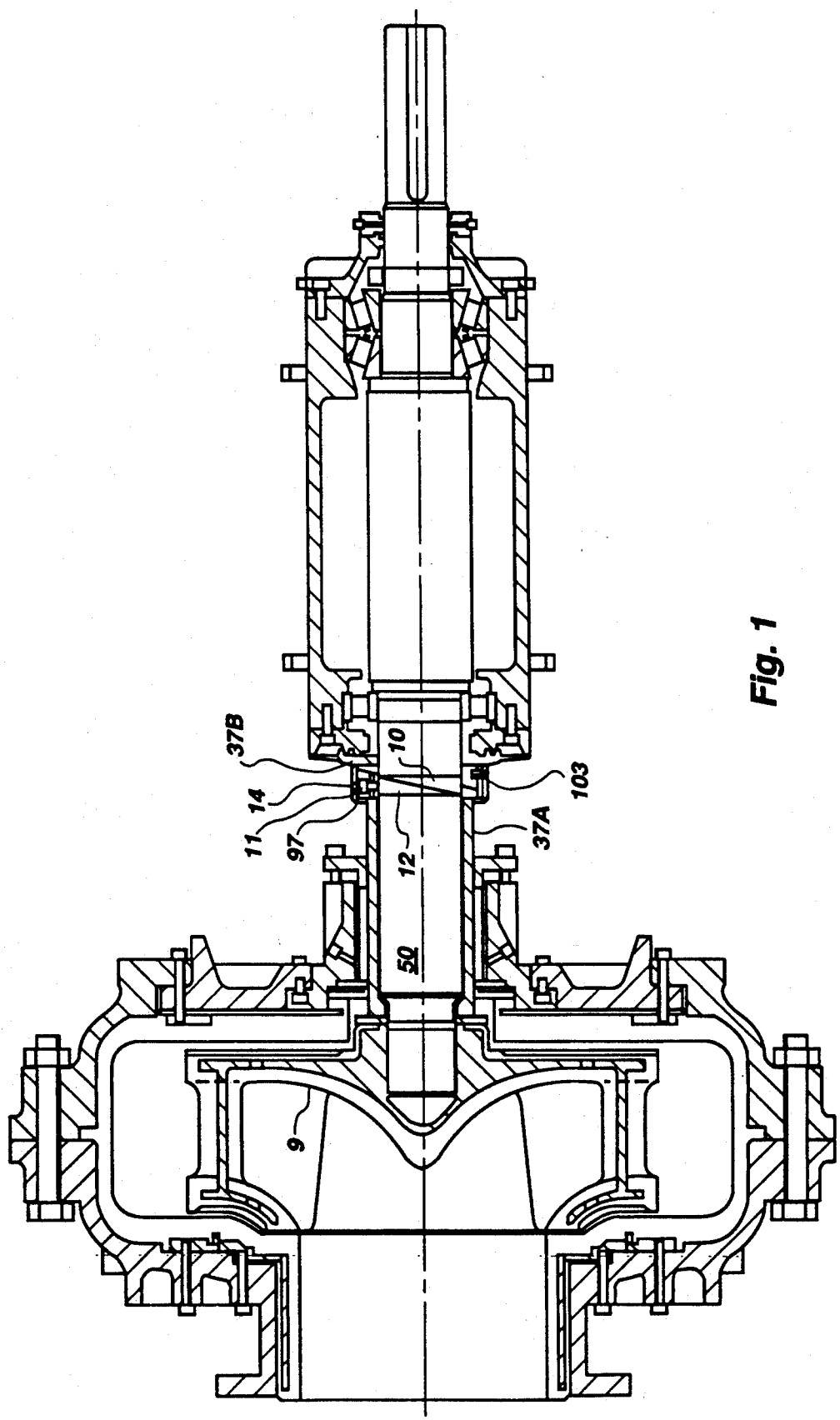
FIG. 1 is a cross-sectional view of a pump impeller structure shown fitted with the impeller release collar of the invention.
Figure 2:
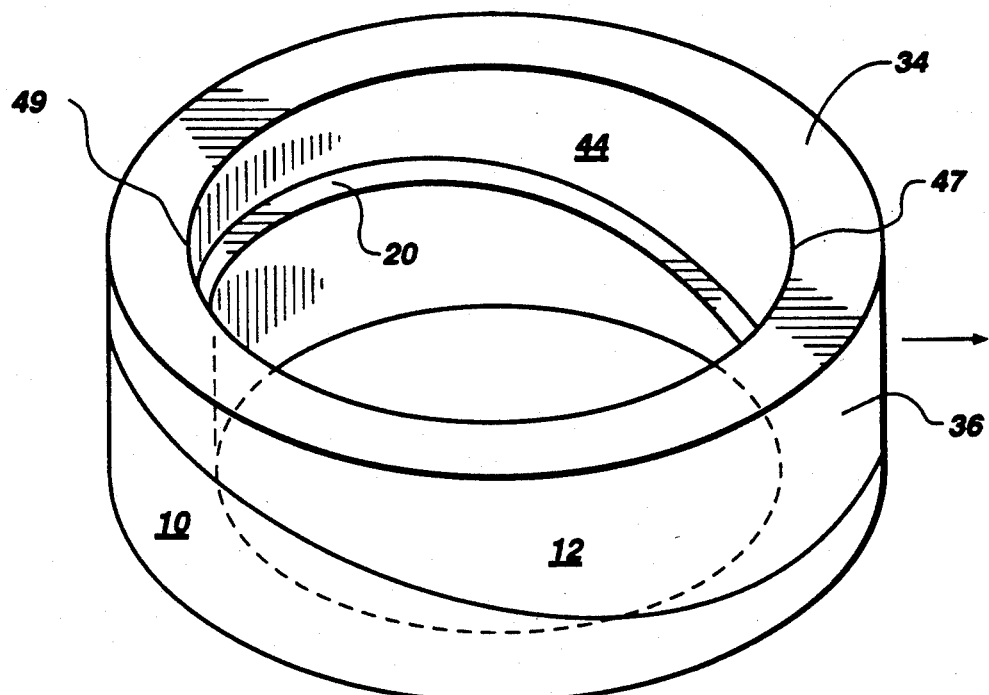
FIG. 2 is a top elevational perspective view of a collar assembly of the instant invention.
Figure 3:
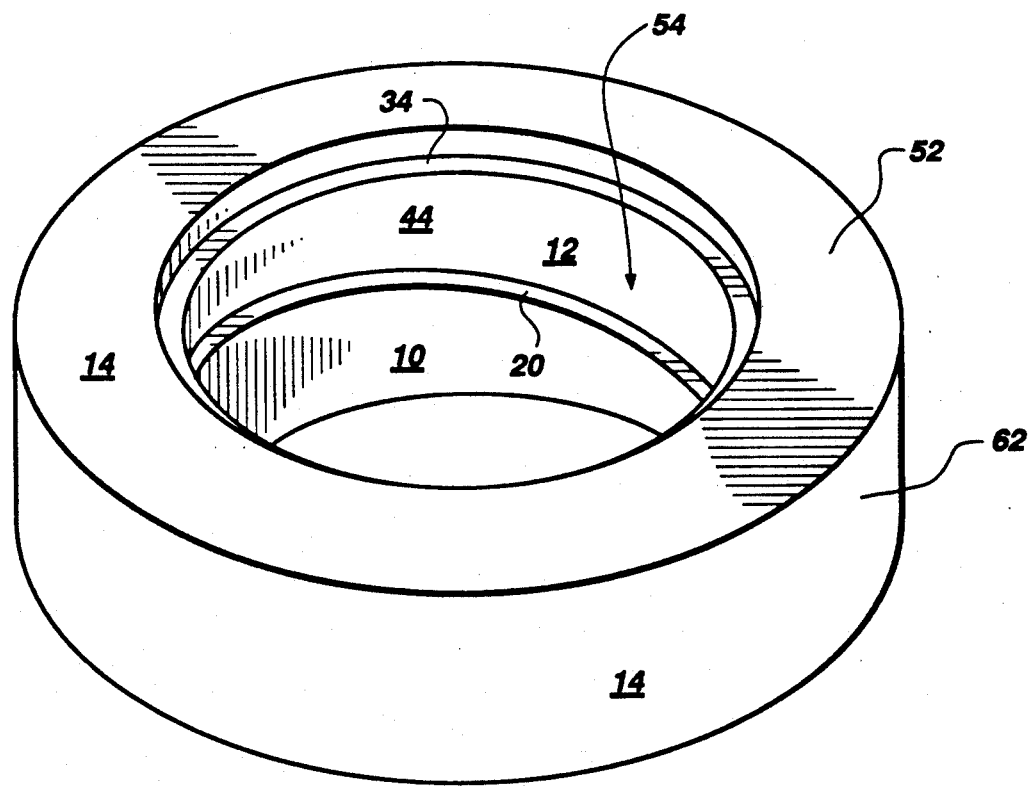
FIG. 3 is a top elevational perspective view of the collar assembly of the invention, including a cover positioned thereabout.
Figure 4:
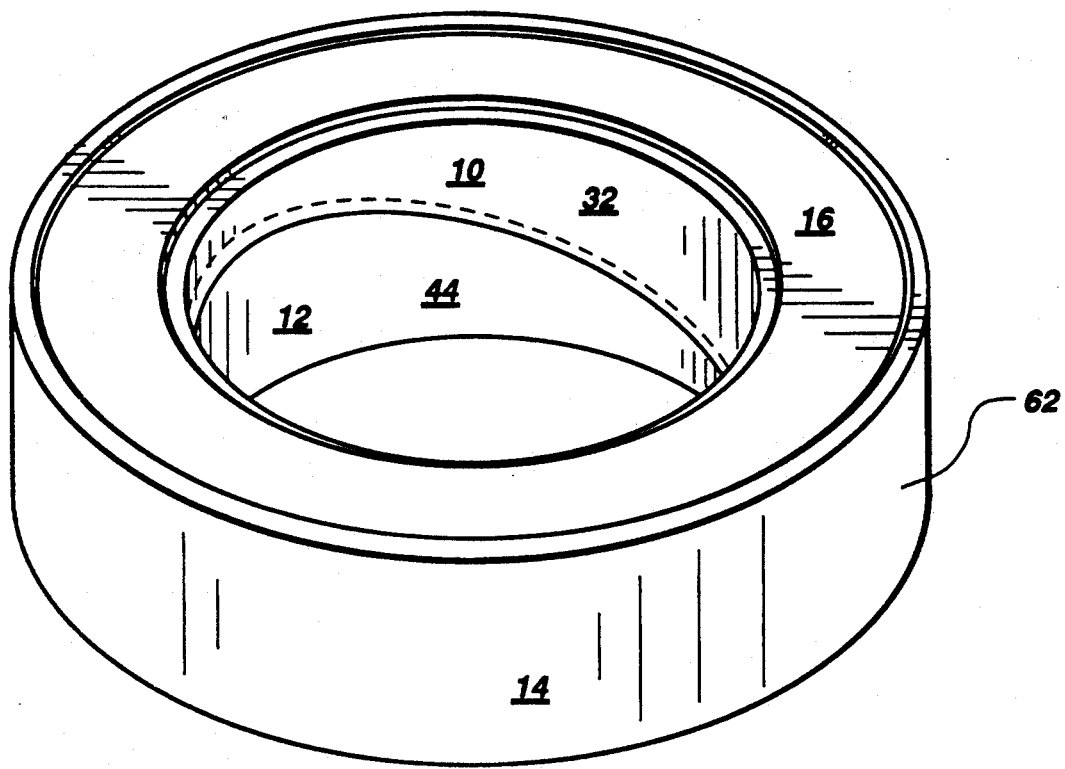
FIG. 4 is a bottom elevational perspective view of the collar assembly and cover of FIG. 3.
Figure 5:
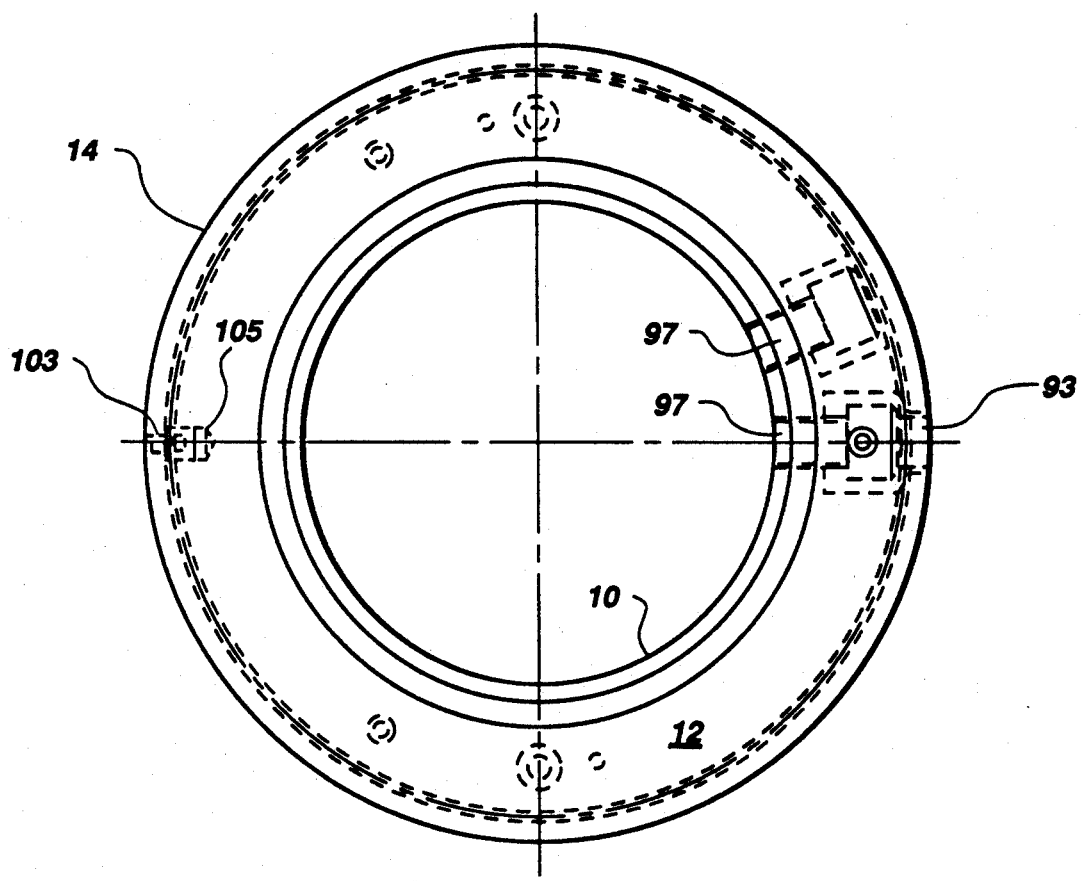
FIG. 5 is a top plan view of the collar assembly and cover shown in FIG. 3.

FIG. 1 illustrates the release collar assembly 11 of the invention shown mounted on a shaft 50 having an impeller 9 mounted thereon. The assembly 11 is positioned between a pair of shaft-mounted members 37A and 37B. As shown in FIG. 2, the collar assembly of the instant invention may be viewed as being composed primarily of two distinct members: a first collar 10 and second collar 12. As shown in FIG. 3, a cover member 14 may be positioned about the two collars 10 and 12.

The First Collar

Figure 6:
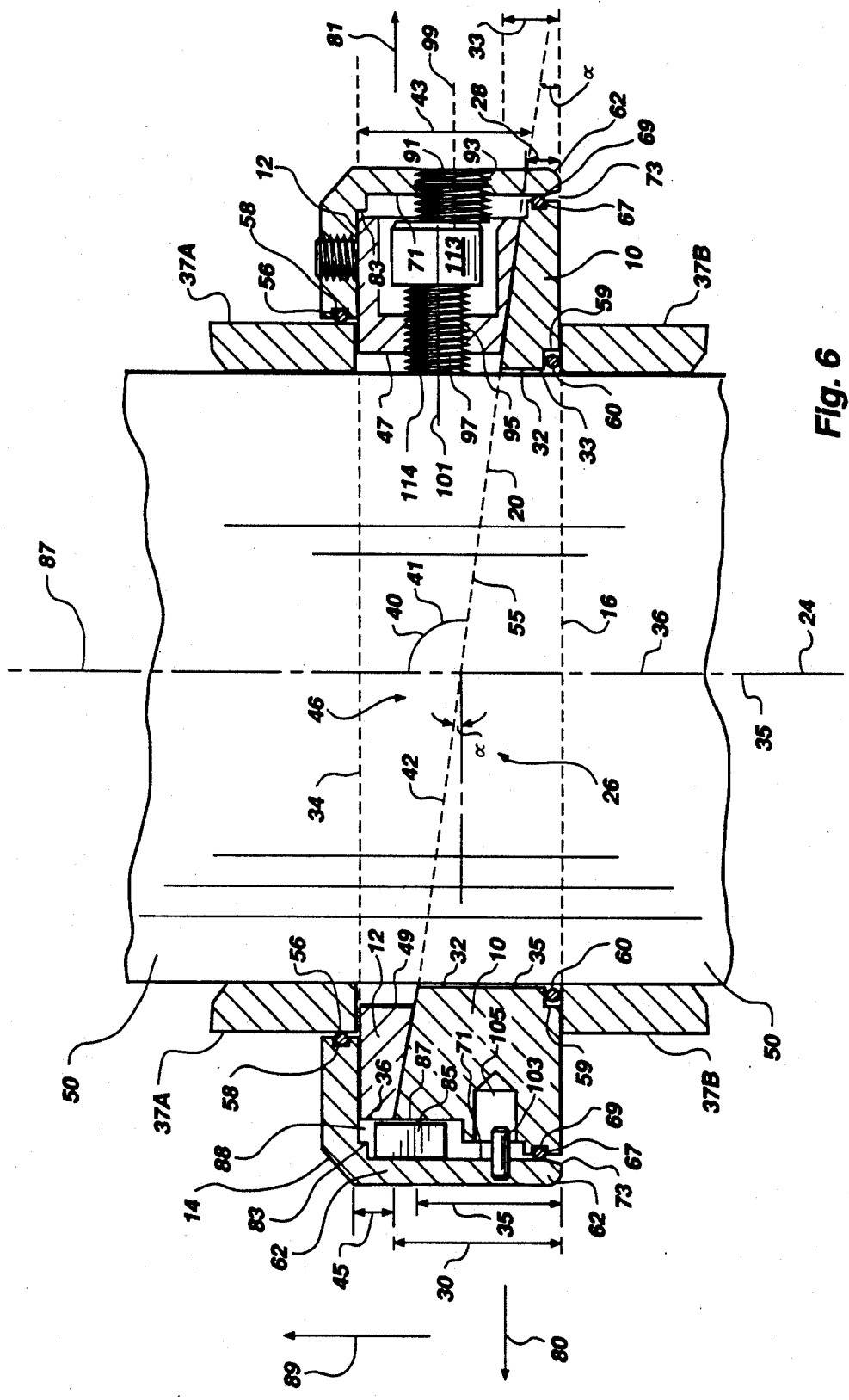
FIG. 6 is a cross-sectional view of the collar assembly and cover shown in FIG. 3, in a first orientation.
Figure 7:
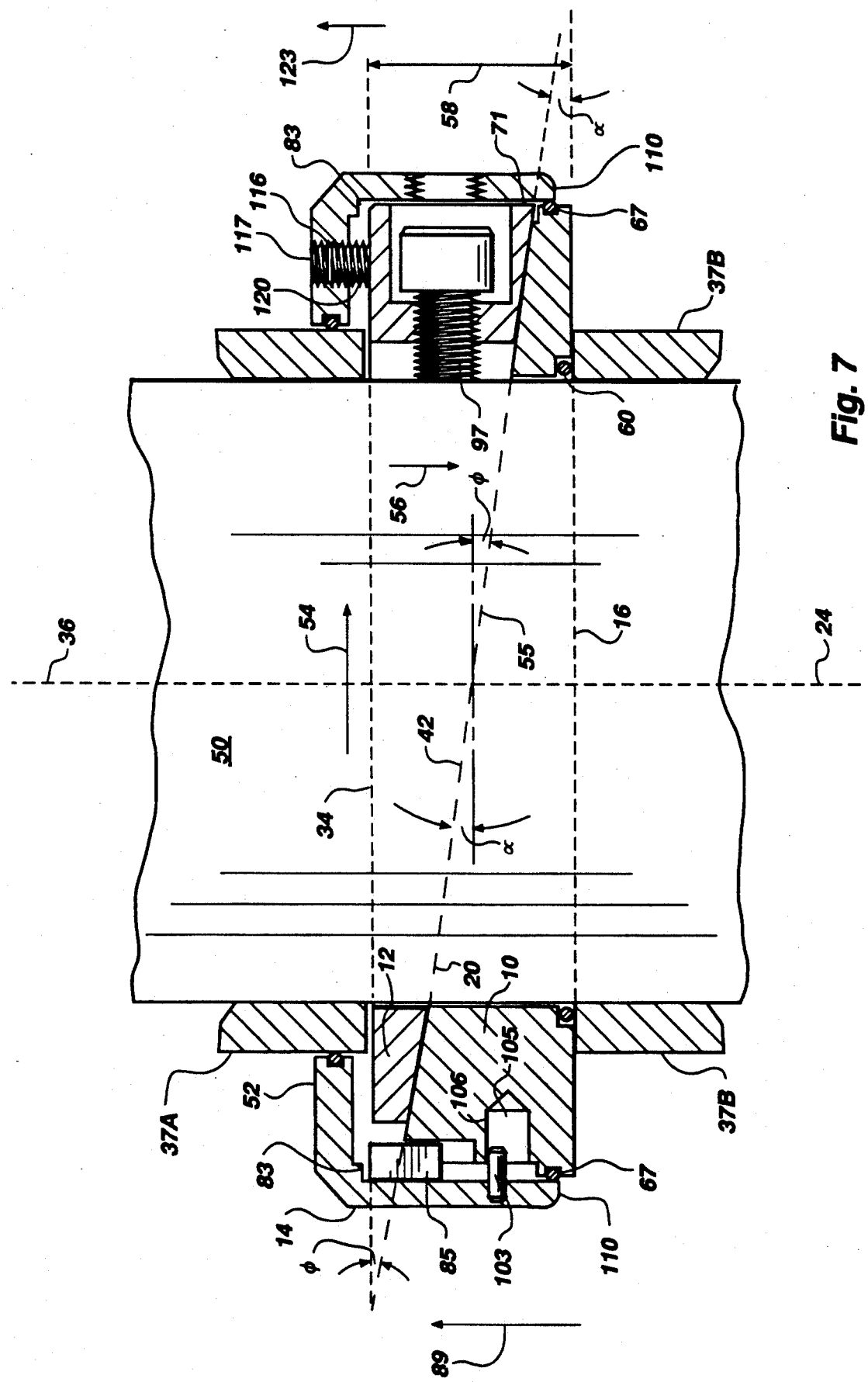
FIG. 7 is a cross-sectional view of the collar assembly and cover of FIG. 3, shown in a second orientation.
Figure 8:
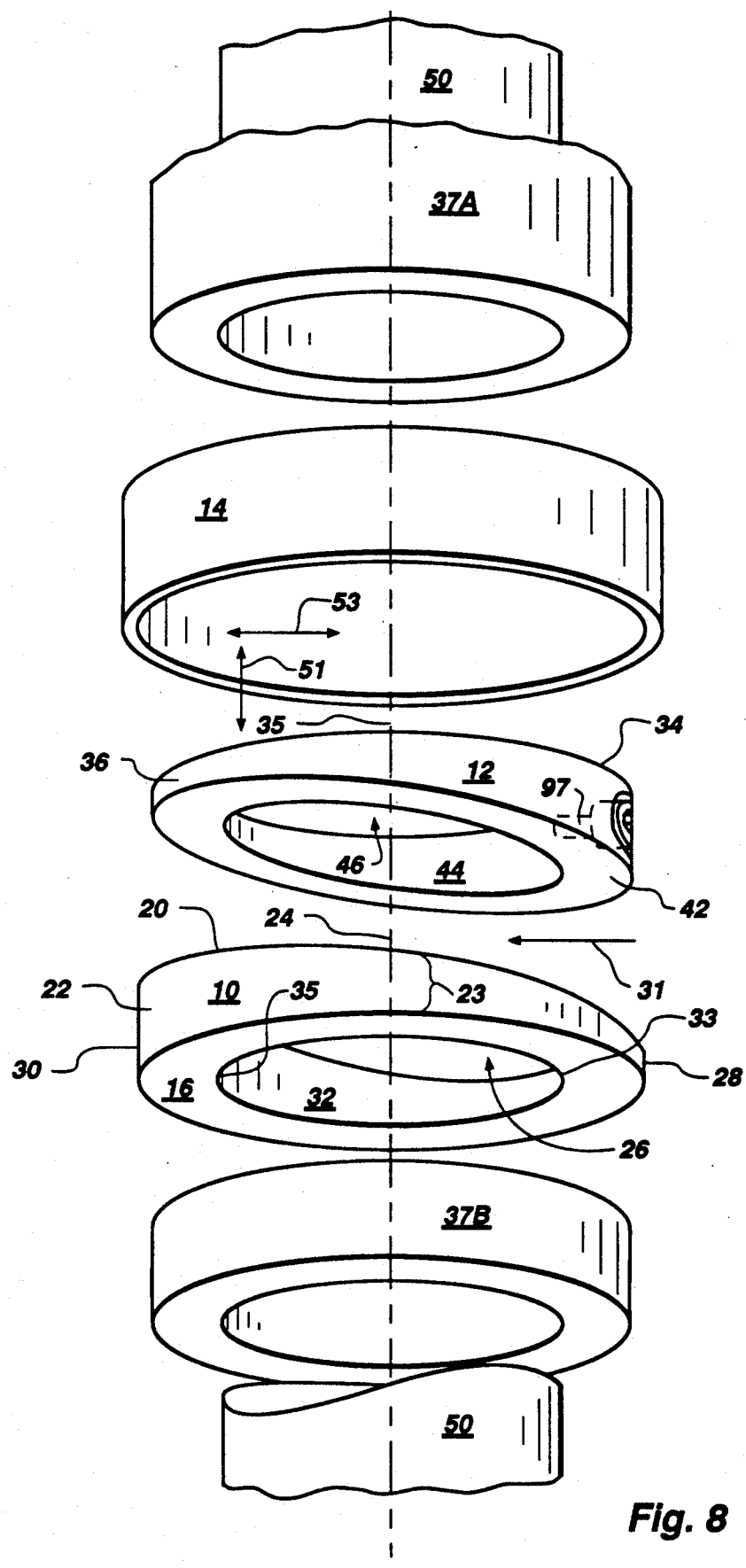
FIG. 8 is an exploded view of the collar assembly and cover shown in situ between a pair of shaft sleeve members mounted on a shaft.
Figure 9:
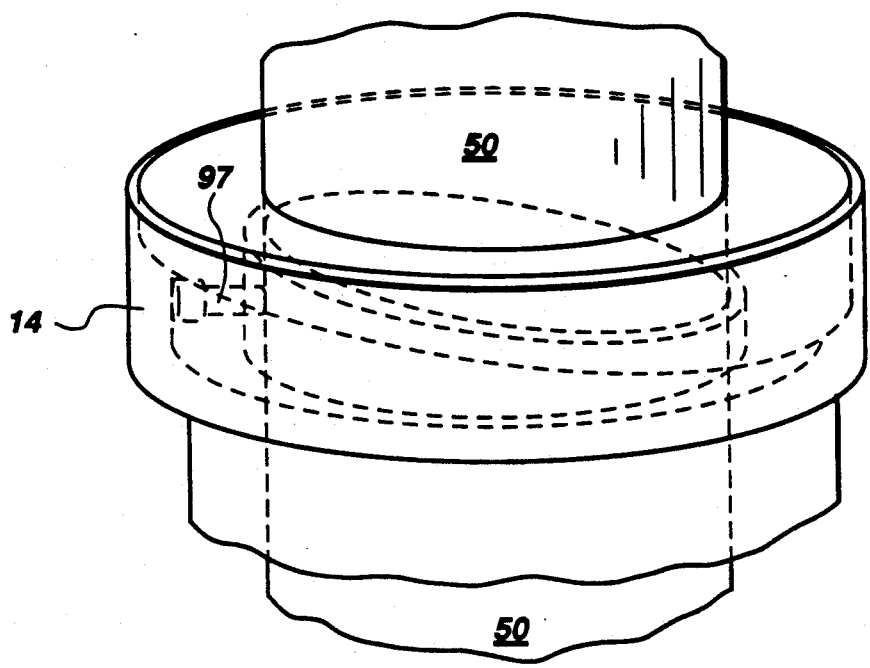
FIG. 9 is a perspective view of a collar assembly and cover of the instant invention shown positioned on a shaft corresponding to FIG. 6.
Figure 10:
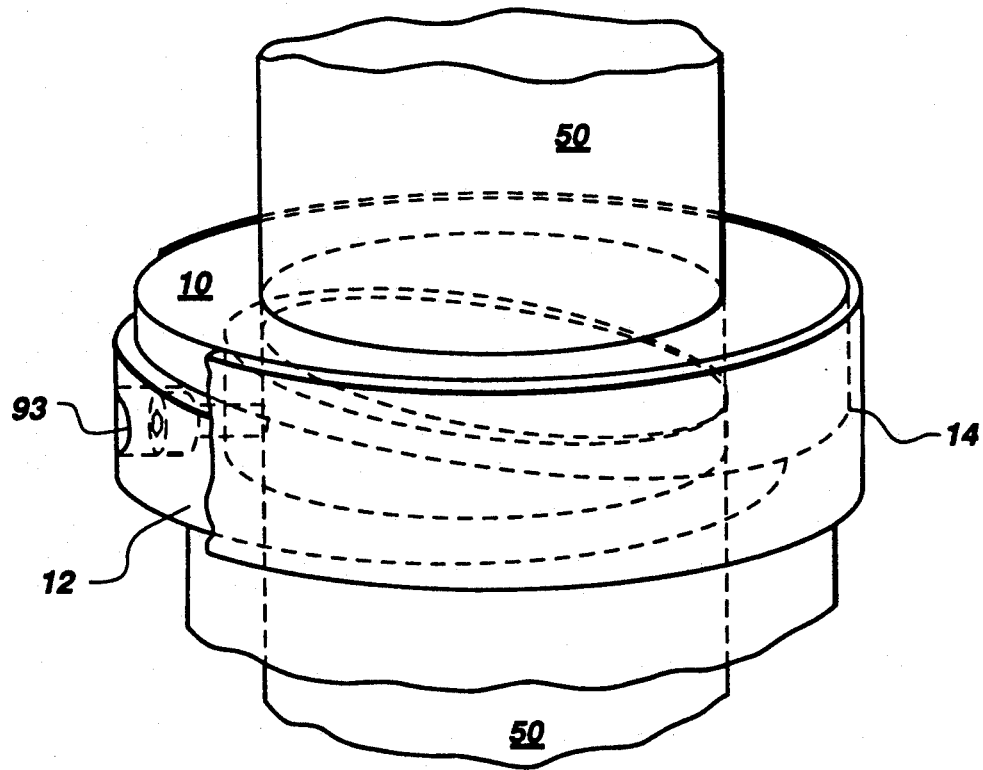
FIG. 10 is a perspective view of the collar assembly and cover positioned on a shaft wherein one collar has been displaced vis-a-vis the other corresponding to the orientation originally shown in FIG. 7.

As shown to advantage in FIG. 8, the collar 10 is a generally hollow, cylindrically shaped member having a tubular appearance. Collar 10 includes a planar bottom surface 16, a planar top surface 20 and a cylindrically shaped sidewall 22 which extends between the bottom surface 16 and top surface 20. The plane of bottom surface 16 is oriented perpendicular to the longitudinal axis 24 of collar 10. The sidewall 22 is configured to extend parallel to the longitudinal axis 24. It follows that the bottom surface 16 is oriented perpendicular to the sidewall 22. The plane of top surface 20 is oriented at an angle α to the plane of the bottom surface 16 (FIG. 7). The upright sidewall 22 has a width 23 which varies dimensionally over the circumference of the collar member 10. As shown, the collar 10 also defines a generally cylindrically shaped channel 26 which extends from top surface 20, through the width of collar 10, to the bottom surface 16. The longitudinal axis 27 of channel 26 is oriented collinear with the longitudinal axis 24 of the collar 10. Both bottom surface 16 and top surface 20, define a generally annular-shaped configuration. The plane of top surface 20 is oriented at an angle to the longitudinal axis 24 of the collar member 10. As shown to advantage in FIG. 6, the plane of the top surface 20 is oriented at an angle, generally designated as 40, to the longitudinal axis 24 of the collar 10. The angulated orientation of the bottom surface 16 to the top surface 20 results in the height of the sidewall 22 of the collar 10 being dimensionally varied over the circumference of the collar. As shown to particular advantage in FIG. 8, the sidewall 22 obtains a maximum height 30 and a minimum height 28. Between these two widths, the dimensional width of the sidewall 22 varies continuously. This is best illustrated in FIG. 8, wherein the dimensional height of the sidewall 22 is shown to increase continuously over each half of its circumference as the sidewall extends from the minimum height 28 to the maximum height 30 in the direction shown by arrow 31.

The interior channel 26 is defined by an upright sidewall 32 formed by the structure of collar 10. The sidewall 32 is generally cylindrically shaped and is positioned concentrically within the outer sidewall 22 about longitudinal axis 24. Similar to the exterior surface sidewall 22, the inner sidewall 32 also has a height which varies dimensionally over the circumference of the sidewall. It obtains a minimum height 33 and a maximum height 35. Similar to external sidewall 22, the inner sidewall 32 has a height which varies continuously between the point of minimum height 33 and the point of maximum height 35. As illustrated in FIG. 6, the height of this sidewall can be viewed as increasing continuously and linearly between the minimum and the maximum heights of the sidewall 32.

The Second Collar

The second collar 12 (FIG. 8) is constructed similarly to the collar 10. It defines a planar top surface 34, an upright sidewall 36 and a planar bottom surface 42. The top surface 34 is formed in a generally annular configuration similar to bottom surface 16. The bottom surface 16 and top surface 34 are both configured to form solid, planar abutment surfaces for contacting and otherwise engaging a respective structural member 37A or 37B which is positioned in an abutting and adjacent relationship thereto on a shaft 50. The plane of surface 34 is adapted to be oriented perpendicular to the longitudinal axis 38 of the collar 12. The upright wall 36 is generally cylindrical in configuration, and is oriented to extend parallel to the longitudinal axis 38 of the collar 12. The sidewall 36 is oriented to extend perpendicularly outward from the top surface 34. The bottom surface 42 is planar in construction. As shown in FIG. 7, the plane of bottom surface 42 is oriented at an angle $\phi$ to the plane of the top surface 34. In preferred constructions, the angle measurement of angle $\alpha$ is equal to the angle measurement of angle $\phi$. In preferred constructions, the degree measure of the angle $\alpha$ as well as the angle $\alpha$ is equal to the arc tangent of the coefficient of friction which corresponds to the contact of the bottom surface 42 with the top surface 20. The bottom surface 42 is positioned at an angle 41 to the longitudinal axis 38. In preferred constructions, the degree measure of angles 40 and 41 are equal. The bottom surface 42, similar to the bottom surface 16, defines an annularly-shaped configuration.

The sidewall 36, similar to the sidewall 22 of collar 10, also has a height which varies dimensionally about the circumference of the collar 12. Owing to the angled planar orientation of the bottom surface 42, the sidewall 36 obtains a maximum height 43 and a minimum height 45. The height of the sidewall 36 diminishes continuously over each half of its circumference between the maximum height 43 (FIG. 6) and the minimum height 45. As shown to advantage in FIGS. 2 and 6, the two collar members 10 and 12 are positioned to place the top surface 20 in an abutting relationship with the bottom surface 42. The particular positioning shown in FIGS. 2 and 6 results in the collinear positioning of the longitudinal axes 24 and 38.

The second collar 12 defines an inner channel 46 which extends through the complete width of the collar 12. The interior channel 46 communicates both with the bottom surface 42 and the top surface 34 of collar 12. The channel 46 is generally cylindrical in configuration though one end thereof, i.e., the end which is positioned proximate the bottom surface 42 of collar 12 is angulated corresponding to the angled orientation of the bottom surface 42. The channel 46 is defined by a sidewall 44 which corresponds generally to the sidewall 32 of collar 10. Sidewall 44 is generally cylindrical in orientation and defines a height which varies dimensionally about the circumference of the sidewall 44. As shown, the sidewall 44 obtains a maximum height 47 and a minimum height 49. The height of the sidewall 44 varies dimensionally between the maximum height 47 and the minimum height 49 similar to the sidewall 32, i.e., the sidewall 44 decreases continuously over each half of the circumference of the sidewall between the maximum height 47 and the minimum 49. When the two collars 10 and 12 are placed together, the collars are aligned one with another such that the region of maximum sidewall height 35 of collar 10 is positioned atop the region of minimum sidewall height 49 of collar 12. Correspondingly, the region of minimum sidewall height 33 of collar 10 is positioned atop the region of maximum sidewall height 47 of collar 12. Owing to the identical angular orientations of the planes of top surface 20 and bottom surface 42, the placement of the two collars 10 and 12 in an abutting relationship forms a generally right cylindrical structure, wherein the planes of the bottom surface 16 and top surface 34 are oriented perpendicularly to the longitudinal axis 36 of the assembly (FIG. 8).

As shown in FIG. 6, the diameter of the channel 26 is dimensionally smaller than the diameter of the channel 46. Both channels 26 and 46 define a circular cross-section. The diameter and circumference of channel 26 is configured to substantially correspond to the outer diameter and outer circumference of a circular cross-sectioned shaft 50 on which the collar assembly is to be mounted. The general configuration of the sidewall 32 is adapted to permit the placement of the collar 10 about the shaft 50 and provide for the collar 10 to slide longitudinally along the length of shaft 50. In preferred construction, the diameter of the channel 26 exceeds the diameter of shaft 50 by at least the radial displacement required of collar 12 to relieve the compressed sleeve length. This minimum displacement is equal to the sleeve compressed length divided by the tangent of the wedge angle $\alpha$, FIG. 7. In contrast, the diameter and circumference of channel 46 are configured to be larger than the outer diameter and outer circumference of shaft 50. This permits the second collar 12 to be displaced not only longitudinally along the length of the shaft 50 in the direction indicated by arrow 51 (FIG. 8), but furthermore, it also permits the collar 12 to be displaced laterally of the shaft 50 in the direction shown by arrow 53. Furthermore, the collar 12 may be displaced simultaneously longitudinally and laterally with respect to shaft 50. The plane of top surface 34 of the second collar 12 is displaced in a direction parallel to the plane of bottom surface 16. Collar 12 is displaced both laterally and longitudinally with respect to shaft 50.

The displacement of collar 12 along the top surface 20 of collar 10 is shown more clearly in FIG. 7. In FIG. 6, the collars are shown in a first orientation. It is in this orientation that the collar assembly is mounted on the shaft 50 during use. FIG. 7 illustrates the displacement of collar 12 along the top surface 20 of collar 10. As shown, this displacement causes the collar 12 to be displaced laterally from the shaft 50 in the direction indicated by arrow 54 and also longitudinally in the direction indicated by arrow 56 (FIG. 7). As may be further noted, this displacement, owing to the wedge-like shapes of the two collars 10 and 12, causes the distance 58 between the bottom surface 16 and the top surface 34 to be dimensionally decreased. This results in a corresponding decrease in the overall width of the collar assembly which allows for a release of the spring force compression being imposed on the structural members abutting the surfaces 16 and 34.

Cover

The cover element 14 is a generally open, bowl-shaped structure which is generally cylindrical in configuration and having an open end and a somewhat closed bottom end. As shown to advantage in FIGS. 3, 6 and 8, the cover element 14 includes a top 52 which is generally planar and annular in configuration and an upstanding sidewall 62 which is mounted about the perimeter of the top 52. The upstanding sidewall 62 is of uniform height and is generally cylindrical and tubular in configuration. The top 52 of the cover element 14 defines a circular aperture therein which extends through the complete thickness of the cover top 52. This aperture, designated generally 54, is dimensioned to correspond generally with the outer circumference of the shaft sleeve 37A (FIG. 6) against which the collar 12 abuts. A channel 58 is configured within the thickness of cover top 52 contiguous aperture 54 to receive an "O"-ring 56 and retain that "O"-ring therein. This "O"-ring 56 is adapted to form a sealed engagement of the top 52 and the shaft sleeve 37A. The first collar 10 may also be fitted with a "O"-ring 60 adapted to form a sealed engagement of that collar 10 with the shaft 50. As shown to advantage in FIG. 6, the "O"-ring 60 is positioned within an annular channel 59 which is defined within the sidewall 32 of collar 10. Channel 59 is positioned proximate surface 16. "O"-ring 60 is dimensioned to correspond to or be slightly smaller than the outer circumference of the shaft 50 and, due to its flexible, elastic construction, the "O"-ring 60 is adapted to form a sealed engagement against the shaft 50 on the shaft's insertion into channel 26 and thereby seal that shaft against the sidewall 32 of collar 10.

Cover 14 performs two distinct functions. Primarily, it functions to retain the interface between the two collars, i.e. surfaces 20 and 42 isolated from the environment. This prevents contaminants such as soil, water or other substances from attacking the surfaces, thereby leading to changes in the coefficient of friction operative between the two surfaces.

Secondarily, the cover 14 functions as a guide in aligning the two collars 10 and 12 vis-a-vis each other.

In order to meet its first function, the cover 14 is manufactured from a non-porous, rigid material preferably metallic or plastic. The body of the cover is positioned about the collars in a sealed relationship. As previously described, the "O"-ring 56 seals one end of the cover against the shaft sleeve 37A sufficient to preclude contaminants from entering the collar assembly via the opening between the shaft sleeve 37A and the collar assembly. Though not an actual part of cover 14, the "O"-ring 60 is positioned to seal the collar 10 against the shaft 50 and thereby preclude the entry of contaminants through the opening between collar 10 and shaft 50.

A third "O"-ring 67 (FIG. 6) is mounted within an annular channel 69 defined in the circumference of collar 10. "O"-ring 67 is adapted to sealingly engage the inner surface 71 of cover 14 and thereby preclude the entry of contaminants into the collar assembly through the opening 73 between the collar 10 and the inner surface 71.

The three "O"-rings in conjunction with the solid body construction of the collar 10 and cover 14 provides a sealed construction for the collar assembly which precludes contact of contaminants on the interface surface.

To meet its secondary function, the cover 14 is constructed to include a number of guides which function to position two collars 10 and 12 in a preselected orientation vis-a-vis each other.

The upstanding sidewall region 62 of the cover is dimensioned to extend sufficiently to contact the sidewalls of both collars 10 and 12. When the cover 14 is placed over the two collars 10 and 12, the very structure of cover sidewall urges the collars into a physical abutting orientation and controls to some degree any displacement of the two collars in the directions indicated by arrows 80 and 81 (FIG. 6).

Mounted on the inner surface 71 of the cover 14 proximate the intersection of sidewall 62 and top surface 52 is an outwardly extending lip 83. As shown in FIG. 6, lip 83 abuts against collar 12 about a portion of the perimeter of collar 12 and positions that collar at a selected orientation vis-a-vis the collar 10.

Mounted on the inner surface 71 of cover 14 is a vertically disposed key 85. The key 85 may be removably mounted on cover 14. In one construction, the collar 14 defines a vertically disposed channel therein which is configured to slidably receive the key 85. The collars 10 and 12 each define a channel 87 and 88, respectively, dimensioned to slidably receive the key 85. The channels 87 and 88 are configured such that upon the insertion of the key 85 into those channels, the key 85 substantially restricts any movement of the two collars relative to one another, specifically a rotation of the collars relative to one another about the longitudinal axis 86 of shaft 50. Recognizably, the key 85 provides a ready means of aligning the two collars in their preferred relative orientation during the assembly of the collar assembly.

Both the key 85 and the lip 83 also function to retain the two collars in their selected orientations during operation of the collar assembly.

When the collar assembly is to be disassembled, in order to release compressive loading on the shaft sleeves 37, the user displaces the cover 14 in the direction of arrow 89 (FIG. 7). The invention includes two structures which assist the user in determining the correct displacement of the cover 14 during this disassembly process. First, a male-threaded plug 91 is threadedly secured in a female-threaded channel 93 defined within the structure of cover 14. The channel 93 provides the user with a means of accessing a male-threaded jack screw 97 which is threadedly secured in a female-threaded channel 95 defined in collar 12.

The cover 14 is designed such that even a user who is unfamiliar with the cover's operation would, upon using common sense, be able to effectively disassemble the collar assembly. As shown to advantage in FIG. 6, the channel 93 is offset from the jack screw 97. The longitudinal axis 99 of the channel 93 is not collinear with the longitudinal axis 101 of the jack screw 97. Upon the user's removal of plug 91, the user is able to view through channel 93 the jack screw 97. Recognizing that the channel 93 must be displaced in order to align the channel 93 with the jack screw 97 in order to permit the insertion of a tool through channel 93 in order to turn, i.e., rotate jack screw 97, the user is led to position the cover 14 such that the channel 93 is aligned with jack screw 97, thereby aligning the respective longitudinal axes of the channel 93 and the jack screw 97.

The cover 14 also includes a pin 103 which is secured in the cover 14 preferably diametrically opposite the jack screw 97. Pin 103 extends outwardly, generally perpendicularly from the inner surface 71 of cover 14. Observably, this aperture construction permits the user to install the cover 14 over the collars 10 and 12 and thereafter insert the pin 103 into position. The pin 103 is received within a recess well 105 defined within collar 10. As shown in FIG. 6, when the collars 10 and 12 and cover 14 are positioned in the installed configuration as show, the pin 103 is positioned within the recess well, preferably without any contact against the sidewalls of the recess well. As the cover 14 is displaced in the direction indicated by arrow 89, the pin 103 eventually engages and abuts against the sidewall 106 of recess well 105. This engagement functions to preclude any further displacement of the cover 14 in the direction indicated by arrow 89. It follows that should the user fail to utilize the channel 93 and jack screw 97 as a guide to the proper displacement of the cover 14 over the collars 10 and 12, the pin 103 serves as a secondary guide means to assist the user in making the proper cover 14 displacement. The extent of this displacement is important in that the end 110 of cover 14 must not be displaced in the direction of arrow 89 such that its engagement against "O"-ring 67 is disturbed, i.e., disrupted. The pin 103 is positioned such that it engages against sidewall 106 and precludes further displacement of the cover 14 prior to the disengagement of the "O"-ring 67 against the inner surface 71 of cover 14. It follows that the pin 103 assists in retaining the sealing function of the "O"-ring 67 and the cover 14.

In the cover orientation illustrated in FIG. 7, pin 103 has engaged sidewall 106. As is observable, the inner surface 71 of cover 14 continues to engage the "O"-ring 67 in this orientation.

As the cover 14 is displaced in the direction of arrow 89, the collar 12 is disengaged from its abutment against lip 83. With this disengagement, the collar 12 may be displaced in the direction indicated by arrow 54. This displacement may be forcedly accomplished by the user's threaded insertion of the jacking screw 97 from its female-threaded channel 95 by means of a wrench acting on the head 113 of jack screw 97 through channel 95. As the jack screw 97 is inserted through channel 95, the free end 114 of the screw 97 contacts shaft 50. Upon further insertion of the screw 97 through channel 95, the collar 12 is displaced laterally from shaft 50 as shown in FIG. 7. As illustrated, with the cover 14 in its displaced orientation, the collar 12 is free to be displaced laterally until it contacts the inner surface 71 of cover 14 or shaft 50. As the collar 12 is displaced in the direction of arrow 54, the collar 12 is displaced longitudinally as well as laterally. The collar 12 being abutted against collar 10 along surface 20 essentially is displaced in a direction parallel to the plane 55 of the interface. Owing to the wedge shape of the collars, as the collar 12 is displaced along the surface 20 of collar 10, the width 58 of the two collar members assembly is dimensionally reduced. With this reduction in width the compressive loading on the collar assembly by shaft sleeves 37 is correspondingly reduced.

In the illustrated embodiment of FIGS. 7, a male-threaded auxiliary jack screw 117 is shown threaded into a female-threaded channel 116 formed in the top 52 of cover 14. Screw 117 is positioned to be rotated by a user by means of a screwdriver slot or hex opening, e.g. Allen heads formed in the outer end of the screw. As the screw 117 is inserted through channel 116, the end 120 of the screw 117 abuts against collar 12. With a further insertion of the screw 117 through channel 116, the cover 14 is displaced outwardly from collar 12 in the direction shown by arrow 123. Jack screw 117 is therefore usable to forcedly displace the cover 14 over the two collars 10 and 12 in the direction indicated by arrow 89.

It is to be understood that the instantly described embodiment is intended solely as a description of a preferred embodiment. Those skilled in the art will recognize that the embodiments herein discussed are illustrative of the general principals of the invention. The embodiments herein described are not intended to limit the scope of the claims which themselves recite what applicant regards as his invention.

What is claimed:

1. A pump impeller release collar assembly for use in releasing compression loaded members stacked on a shaft, said assembly comprising:

a pair of collars, a first collar being mountable on a shaft, said first collar having a first planar inner surface which is orientable transverse to a longitudinal axis of said shaft;

a second collar mountable on said shaft contiguous said first collar, said first collar and said second collar being positionable between a plurality of members stacked on said shaft; said second collar defining a second inner surface positioned contiguous said first inner surface, said second collar having a mounting means associated therewith adapted for rendering said second collar radially displaceable from said shaft's longitudinal axis, said first collar and said second collar having an outer surface adapted for engaging a respective said member stacked on said shaft; said pair of continuously-mounted collars defining a distance between said outer surfaces;

wherein said distance is reduced by displacing said second collar radially and axially of said shaft's longitudinal axis, said distance reduction functioning to release compressive loading on members stacked on said shaft.

2. The pump impeller release collar assembly of claim 1 wherein said second inner surface is planar.

3. The pump impeller release collar assembly of claim 2 wherein said first inner surface and said second inner surface are mounted parallel one another when said collars are mounted on said shaft.

4. The pump impeller release collar assembly of claim 1 wherein said first planar inner surface is oriented at an acute angle to said longitudinal axis of said shaft when said first collar is mounted on said shaft.

5. The pump impeller release collar assembly of claim 1 wherein said first planar inner surface is oriented at an obtuse angle to said longitudinal axis of said shaft when said first collar is mounted on said shaft.

6. The pump impeller release collar assembly of claim 1 wherein said first collar defines a bore therethrough dimensioned to receive said shaft and form a close-fit union therewith.

7. The pump impeller release collar assembly of claim 6 wherein said second collar defines a second bore therethrough dimensioned to receive said shaft, said second bore being sufficiently large to permit said second collar to be displaced radially of said longitudinal axis of said shaft.

8. The pump impeller release collar assembly of claim 1 wherein said first collar is wedge shaped in configuration.

9. The pump impeller release collar assembly of claim 1 wherein said second collar is wedge shaped in configuration.

10. The pump impeller release collar assembly of claim 1 further including a cover mounted about said collars for retaining said first and second inner surfaces isolated from the environment.

11. An apparatus for use in releasing compression-loaded members stacked on a shaft, said apparatus comprising:

two collars adapted for contiguous mounting on a shaft between members stacked on said shaft, each said collar defining a member-engaging outer surface and a planar inner surface, each said collar being adapted for orientation at an acute angle to a longitudinal axis of said shaft; a first said collar defining a first bore therethrough dimensioned to receive said shaft while precluding a radial displacement of said first collar relative to a longitudinal axis of said shaft; a second said collar defining a second bore therethrough configured to be larger than said first bore; said second bore being dimensioned to receive said shaft and permit a radial displacement of said second collar relative to said longitudinal axis of said shaft upon said second collar's installation on said shaft; said second collar being displaceable radially and axially from said longitudinal axis of said shaft wherein said collars define a distance between said member-engaging outer surfaces;

wherein said distance is dimensionally diminished upon a radial and axial displacement of said second collar which results from one said inner surface sliding along another said inner surface.

12. The apparatus of claim 11 wherein said first collar includes a displacement means for forcedly displacing said second collar radially of said shaft.

13. The apparatus of claim 12 wherein said displacement means is a male-threaded bolt, threadedly inserted into a female-threaded aperture defined in and extending through said second collar, said bolt passing through said aperture to abut against said shaft, a threaded displacement of said bolt through said aperture effecting a displacement of said second collar in a direction perpendicular of said longitudinal axis of said shaft.

14. Pump impeller release collar assembly for selective release of compressive loading force generated in a threaded connection on a rotatable shaft assembly fitted with a threaded member, said shaft assembly comprising a shaft having a threaded portion at one end thereof adapted to receive the treaded member in threaded engagement, bearing means at the other end of the shaft mounting the shaft for rotation but preventing axial movement of the shaft relative to the bearing means, an abutment sleeve mounted on the shaft for limited axial movement adapted to be engaged by the threaded member to limit axial movement of the threaded member on the shaft upon threaded assembly of the threaded member for generating a predetermined level of compressive force in the threaded connection but subject to the generation of increased resultant compressive force loading upon further tightening of the threaded member on the shaft; said pump impeller release collar assembly comprising:

a pair of collars carried on the shaft one behind the other in the axial direction of the shaft and generally between the abutment sleeve and the bearing means, said collars being in surface-to-surface engagement and subject to compressive force generated by the threaded member, said collars being mounted on said shaft by mounting means adapted for rendering one of said collars movable relative to the other in a direction along the longitudinal axis of the shaft and in a direction radial to the longitudinal axis of the shaft between a first position, constituting an assembly position, and a second position, constituting a disassembly position, with the collars held in surface-to-surface engagement by compressive loading on the collars;

wherein the collars, when in their assembly position, together presenting a relatively wide axial width and withstanding the full compressive load on the abutment collar, and when in their disassembly position together presenting a relatively narrow axial width for reducing the compressive load on the abutment collar and threaded connection for facilitating disassembly of the threaded member from the shaft.

15. The pump impeller release collar assembly of claim 14 wherein each said collar defines a bore therethrough for receiving said shaft, said collars being adapted for contiguous placement adjacent one another along a planar interface angulated to a longitudinal axis of said shaft on which said collars are mounted, each collar having an outer surface for abutting against a respective member stacked on said shaft, said contiguously placed collars defining a distance between said outer surfaces, said bore of said first collar being dimensioned to correspond to an exterior circumference of said shaft to permit an axial displacement of said first collar along said shaft and substantially precluding a radial displacement of said first collar relative to the longitudinal axis of said shaft, said bore of a second said collar being configured to be dimensionally larger than said bore of said first collar to permit a radial and axial displacement of said second collar relative to said longitudinal axis of said shaft on which said second collar is mounted;

wherein said distance is dimensionally adjustable by displacing said second collar radially and axially of said longitudinally axis of said shaft along said planar angulated interface, a dimensional reduction of said distance functioning to release a compressive loading on members stacked on said shaft.

16. The pump impeller release collar assembly of claim 15 further including a cover means mounted about said collars for retaining said planar interface isolated from the environment.

17. The pump impeller release collar assembly of claim 16 wherein said collars and said cover are fitted with a retaining means adapted for releasably retaining said cover about said collars.

18. The pump impeller release collar assembly of claim 16 wherein said cover is configured to permit a direct engagement of each said collar with its said respective member stacked on said shaft.

19. An apparatus for use in releasing compression forces loading on member stacked on a shaft, said apparatus comprising:

a first collar having a wedge-like shape and defining a planar first inner surface and a first engagement surface adapted to engage a first member stacked on a shaft, said first collar defining a first bore therethrough dimensioned to receive and closely fit against said shaft, said inner surface being oriented at an angle to a longitudinal axis of said shaft when said first collar is mounted thereon;

a second collar having a wedge-like shape and defining a planar second inner surface and a second engagement surface adapted to engage a second member stacked on said shaft, said second collar defining a second bore therethrough dimensioned to be larger than said first bore; said second bore being dimensioned sufficiently large to receive said shaft therethrough and to permit said second collar to be displaced radially from said longitudinal axis of said shaft while said shaft extends through said second bore, said first collar and said second collar being mountable adjacent one another on said shaft with said first and second inner surfaces contiguously abutting one against another, said engagement surfaces being positioned parallel one another;

said second collar defining a female threaded aperture having a longitudinal axis which is positioned radially of said longitudinal axis of said shaft upon said second collar's installation on said shaft;
a male-threaded bolt threadedly inserted into said female-threaded aperture; and
said bolt passing through said aperture to abut against said shaft, a threaded displacement of said bolt through said aperture effecting a displacement of said second collar in a direction perpendicular of said longitudinal axis of said shaft.

20. The apparatus of claim 19 wherein a cover is mounted about said collars to retain said engagement surfaces isolated from the environment, said cover includes a pin configured to extend outwardly from said cover, and one of said collars defining a recess well therein, said pin being received in said recess well.

21. The apparatus of claim 20 wherein said cover defines a female threaded aperture therethrough, said cover including a male threaded removal bolt threadedly secured in said threaded aperture, said removal bolt being threadedly displaceable through said aperture parallel to said longitudinal axis of said shaft to engage one of said collars, and displace said cover outward from said collars along a direction parallel to said longitudinal axis of said shaft.

22. The apparatus of claim 21 wherein said cover defines an opening therein adapted to register with a head of said male-threaded bolt, upon said cover being positioned in a first orientation about said second collar, said opening being out of registration with said head of said male-threaded bolt in a second orientation of said cover about said second collar.

23. The apparatus of claim 22 wherein said recess well is dimensioned to permit a displacement of said pin therein, said pin being positionable in a first condition and a second condition, in said first condition said cover being positioned in its first orientation, in said second condition said cover being positioned in said second orientation.

24. The apparatus of claim 23 wherein said cover is adapted to be axially displaceable along said second collar, between said first and second orientations.

* * * * *